Patented Aug. 17, 1926.

1,596,494

UNITED STATES PATENT OFFICE.

FERNANDO C. KERN AND FREDERICK E. KERN, OF BALTIMORE, MARYLAND.

PROCESS OF MAKING POROUS SILICEOUS OBJECTS.

No Drawing.   Application filed December 14, 1925. Serial No. 75,388.

Our invention relates to the art of making porous brick and other porous bodies of clay and similar plastic materials.

It has been proposed heretofore to make porous brick by mixing with clay from 20 to 40 per cent by weight of sawdust, depending upon the plasticity and binding quality of the clay; adding water to the mixture to form a paste; forming bricks or other desired shapes; and then drying and burning the bricks or other objects. During the burning operation, the sawdust in the plastic mass is consumed, leaving pores or cells in the finished product, the number of such cells corresponding to the number of particles contained in the original plastic mixture. The products obtained by the method referred to have been found to be insufficiently porous for many industrial purposes and attempts to increase porosity by increasing the proportional amount of sawdust have failed. Thus, when 100 parts by weight of sawdust are mixed with 100 parts of clay and 300 parts of water, the binding effect of the clay, and hence the strength of the resulting products, are very seriously impaired. This is due not merely to the relatively large volume of the sawdust but even more to the fact that the sawdust tends to absorb most of the added water, thus militating against the necessary function of the water in binding the materials together during the drying stage. The disadvantageous effect is further magnified by excessive swelling of the sawdust, and when this swelling takes place after the bricks or other shapes have been formed, cracks may develop even before the drying stage begins. Again, when the bricks are heated an enormous quantity of water is vaporized, and this vapor, breaking through the clay, tends to strain the structure of the bricks while, simultaneously the binding strength of the clay particles is being weakened by the shrinking of the sawdust, thus causing additional fissures and partings in the dried shapes. Efforts to control the absorptive and expansive qualities of sawdust by impregnating it with moisture repelling agents have been partially successful, so far as concerns the behavior of the sawdust, but it has been found that the moisture repelling agents thus far employed have deleteriously affected the chemical and physical properties of the silicates.

The object of our invention is to eliminate the difficulties outlined above and, in consequence, to produce brick and other objects formed of dried and burned clay or the like, having higher combined porosity and strength than have heretofore been obtained in such products. With this object in view, our invention contemplates, in part, the substitution for the crude sawdust or impregnated sawdust of the prior art, of a material which has superior attributes for the purpose.

We have found that partial volatilization of wood, at relatively low temperatures, yields a product which in a very marked degree lacks the capacity for taking up water and swelling, which renders the use of crude sawdust so objectionable, as explained above. Moreover, this product has low resiliency and elasticity, as compared with crude sawdust, so that the former, unlike the latter, may be closely compacted when mixed with clay and subjected to pressure.

If wood, in the form of lumps, chips or dust, is heated, under exclusion of air, at a relatively low temperature, water vapor and small amounts of light volatile substances, such as acetic acid, carbon monoxide and dioxide and hydrocarbons, will be drawn off. Partial vaporization of the nature referred to dissociates cellulose and breaks down more or less of the cell structure. A given quantity of raw sawdust, treated in the above described manner, yields a quantity of modified wood substance which is from 10 to 40% less by weight. Though the substance thus obtained has about the same absorptive qualities as raw sawdust, it does not appreciably swell upon absorbing water nor contract when dried.

The following specific formula will give good results:

Feed raw wood in broken or dust form into a closed or partially closed heating receptacle and subject it to a temperature of about 325° C. for about 10 minutes. A convenient device for this purpose is a cast iron or steel container provided with inlet and discharge ports and having a feeding device adjusted to progress the wood through the container and discharge it after 10 minutes of heating. After the heat treatment permit the wood to cool and reduce it, if required, to a finely divided state. Then mix 125 pounds of this specially prepared wood substance with 100 pounds of refractory clay, add water to form a paste, form the mixture in the desired shapes, dry and burn in the usual manner.

In the example given, the wood is heated preliminarily and before mixing with clay. This, however, is not essential to our invention. Good results may be obtained by mixing 200 parts of raw sawdust containing 20% moisture with 100 parts of fire clay, and then heating the mixture for about 20 minutes under constant agitation at a temperature of about 200° C. In this example the mineral components of the clay act as catalysts and volatilization takes place at a lower temperature (200° C.) than in the first example (325° C.).

As indicated by the examples given, the partial volatilization of the wood may take place at any time before the mixture is formed into shapes and subjected to pressure and burning. It should be understood also that, while two substantially definite temperatures have been given as preferable under the conditions recited in the illustrative examples, nevertheless the benefits of our invention may be realized in varying degrees by employing temperatures other than those mentioned and continuing the heat treatment for longer or shorter periods than those stated. However, it is desirable on the one hand, to carry the volatilization to a point where the modified wood product will have the desired attributes in a substantial degree, and on the other hand, the volatilization should stop considerably short of complete carbonization. It is preferable to leave in the roasted wood large quantities of pyrolignic acid, besides acetic acid, acetone and light tar. These components will be readily consumed during the burning stage at relatively low temperatures, thus causing the formation of numerous cells in the brick even before the maximum temperature has been reached in the kiln. A complete carbonization of the wood in the preliminary treatment is undesirable, among other reasons, because charcoal, burning exothermically in the kiln, would generate an excessive amount of heat and tend to produce a fused dense mass. In general, the preliminary heating of the wood should be conducted under conditions which will make the action exclusively endothermic. This condition may be maintained by keeping the vaporizing temperature below the ignition point of the combustible substances or by excluding air during the preliminary heating, or both expedients may be used.

The best modified wood product for the purposes stated is one in which volatilization has been carried to the point at which the product has a dark brown color. At this stage there will have been little or no vaporization of acetone, the cellulose will be dissociated but not the lignine. The volatile combustibles (acetones, light tars, etc.) which are left in the modified wood substance have an important function during the burning stage, for we find that the whole mass of woody substance, including all of the carbon, will be consumed at a temperature considerably lower than the temperature necessary to completely consume an equivalent mass of substantially pure carbon. Moreover, burning carbon generates about 7500 calories per kilogram as compared with 3500 to 4500 calories per kilogram generated by our modified wood substance. The latter produces a lighter, more porous brick than the former because the heat generated by carbon is greatly in excess of the amount required for fusing the siliceous material; thus, if the wood product is too completely carbonized, the burning stage of the process will tend to make a dense product.

While we prefer to use wood as a base for preparing the modified substance, any cellular or fibrous combustible substance may be used instead of wood. For example, good results may be obtained by using peat, partially volatilized and having substantially the same chemical and physical attributes of the modified wood substance.

An improvement on our process as above described consists in adding to the mixture of clay and woody or other fibrous substance, a light porous siliceous substance such as kieselguhr or fuller's earth, etc., or colloidal siliceous substances such as colloidal silicic acid, bentonite, etc. The addition of such a substance produces important results at different stages of the process. In the first place, kieselguhr or its equivalent, seems to act as a catalyst in assisting the mixture of clay, modified wood, and water to become plastic; and in the burning stage, the kieselguhr or its equivalent, serves as a flux and makes it possible to use a lower temperature in the kiln. It also produces a stronger product by acting as a sintering agent for the walls of the pores formed upon combustion of the woody substance. At the same time, the light siliceous substance either enhances, or at least does not militate against, the porosity of the finished brick.

We claim:

1. In the process of making porous siliceous objects by mixing a siliceous base with a cellular or fibrous substance, making the mixture plastic by adding water, forming the mixture into shapes, and then drying and burning the shapes; the step which consists in partially volatilizing the cellular or fibrous substance before the shapes are formed.

2. In the process set forth in claim 1, the step which consists in heating the cellular or fibrous substance until its color becomes dark brown.

3. In the process set forth in claim 1, the step which consists in heating the cellular or fibrous substance until its resiliency or elasticity has been substantially destroyed.

4. In the process set forth in claim 1, the step which consists in heating the cellular or fibrous substance under conditions of temperature and duration of heating which will drive off substantially all ingredients which are more volatile than the acetones but without volatilizing a substantial amount of acetones or ingredients less volatile than acetones.

5. The process of making porous siliceous objects which consists in heating a quantity of wood or other cellular or fibrous substance for about 10 minutes at a temperature approximately 325° centigrade, mixing about 125 parts by weight of the resulting modified cellular or fibrous substance with about 100 parts of clay, adding water to the mixture to render it plastic, forming the mixture into shapes, and drying and burning the shapes.

6. In the process set forth in claim 1, the step which consists in adding to the mixture reactive agents which will render the mixture plastic or act as a flux.

7. In the process set forth in claim 1, the step which consists in adding to the mixture a light porous siliceous substance or colloidal siliceous substance.

In testimony whereof the foregoing specification is signed.

FERNANDO C. KERN.
FREDERICK E. KERN.